US006745627B1

(12) United States Patent
Woodruff et al.

(10) Patent No.: US 6,745,627 B1
(45) Date of Patent: *Jun. 8, 2004

(54) ELECTROSTATIC DRIVE FOR ACCELEROMETER

(75) Inventors: James R. Woodruff, Redmond, WA (US); Peter J. Hesketh, Chicago, IL (US)

(73) Assignee: Honeywell International Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/651,927

(22) Filed: May 21, 1996

(51) Int. Cl.$^7$ ................................................ G01P 15/10
(52) U.S. Cl. .................................................. 73/514.29
(58) Field of Search ...................... 73/514.29, 862.59, 73/DIG. 1, 514.16

(56) References Cited

U.S. PATENT DOCUMENTS

| | | | |
|---|---|---|---|
| 3,221,256 A | 11/1965 | Walden | 328/1 |
| 4,030,347 A | 6/1977 | Norris et al. | 78/88.5 R |
| 4,035,675 A | 7/1977 | Malocha et al. | 310/9.8 |
| 4,200,849 A | 4/1980 | Malocha | 333/194 |
| 4,215,570 A | 8/1980 | Eer Nisse | 73/141 |
| 4,372,173 A | 2/1983 | Eer Nisse et al. | 73/862 |
| 4,384,264 A | 5/1983 | Kadota | 333/193 |
| 4,499,393 A | 2/1985 | Stokes et al. | 310/313 |
| 4,573,357 A | 3/1986 | Meunier | 73/517 |
| 4,676,104 A | 6/1987 | Cullen | 73/516 |
| 4,699,006 A | 10/1987 | Boxenhorn | 73/517 |
| 4,901,586 A | * 2/1990 | Blake et al. | 73/514.29 |
| 5,025,346 A | 6/1991 | Tang et al. | 361/283 |
| 5,136,266 A | 8/1992 | Niitsuma | 333/154 |
| 5,186,844 A | 2/1993 | Burd et al. | 210/782 |
| 5,304,965 A | 4/1994 | Manner | 333/194 |

(List continued on next page.)

FOREIGN PATENT DOCUMENTS

DE            44 24 635 A1    1/1996     ........... G01P/15/02

OTHER PUBLICATIONS

"Polycrystalline Silicon Carbide For Surface Micromaching", A. J. Fleischman et al., 1996 IEEE.
"Electoplated Thick CoNiMnP Permanent Magnet Arrays For Micromachined Magnetic Device Applications", Trifon Liakopoulos et al., 1996 IEEE.
"Coriolis Rate Gyros (CRG)", L.W. Richardson, 1994 IEEE.
"Integrating SCREAM Micromachined Devices with Integrated Circuits", Kevin A. Shaw, 1996 IEEE.

(List continued on next page.)

Primary Examiner—John E. Chapman
(74) Attorney, Agent, or Firm—Honeywell Int'l Inc.

(57) ABSTRACT

A vibratory transducer (22) for an accelerometer (2) having a pair of parallel beams (50, 52) with first and second fixed end portions, and a pair of electrodes (62, 64) positioned adjacent to the beams for generating an electrostatic force to transversely vibrate the beams at a resonant frequency. The vibration frequency of the beam is generally related to axial (i.e., compression or tension) forces applied to either one of the fixed ends of the beam so that the magnitude of the force applied can be measured by changes in the vibration frequency. The electrodes and the beams each have a plurality of fingers (82, 80) extending laterally outward so that the beam fingers and the electrode fingers are intermeshed with each other. The intermeshed fingers reduce the transducer's sensitivity to changes in applied voltage, thereby increasing the accuracy of the frequency signal. In addition, the intermeshed fingers enable the transducer to operate effectively at pressure levels substantially above vacuum to permit gas damping of the proof mass.

1 Claim, 4 Drawing Sheets

U.S. PATENT DOCUMENTS

| | | |
|---|---|---|
| 5,349,855 A | 9/1994 | Bernstein ..................... 73/505 |
| 5,365,138 A | 11/1994 | Saw ........................... 310/313 |
| 5,392,650 A | 2/1995 | O'Brien et al. ................ 73/517 |
| 5,396,200 A | 3/1995 | Machui ....................... 333/196 |
| 5,485,051 A | 1/1996 | Tera ........................ 310/313 B |
| 5,491,604 A | 2/1996 | Nguyen et al. ............. 361/278 |
| 5,496,436 A | 3/1996 | Bernstein ................. 156/628.1 |
| 5,500,549 A | 3/1996 | Takeuchi ................... 257/415 |

OTHER PUBLICATIONS

"Mechanical Pr5operties of Thick, Surface Micromachined Polysilicon Films", H. Kahn et al., 1996 IEEE.

"A Micromachined Comb–Drive Tuning Fork Rate Gyroscope", Dr. Marc Weinberg et al.

"Micromachined Gyroscopes", Jan Soderkvist. 1994 Elsevier Science S.A.

"Initial Results on Micromachined Comb Drive Gyroxcope with EDM2 Electronics", M. Weinberg et al., 1993.

"A Microactuator System For The Study and Control of Screech In High Speed Jets", Chunchieh Huang et al., 1996 IEEE.

"Electrostatic Comb Drive Levitiation and Control Method", William Tang et al. 1992 IEEE.

"Electrostatic Comb Drive of Lateral Polysilicon Resonators", William Tang et al., 1990.

"Transverse Mode Electrostatic MicroactuaTOR For Mems–based HDD Slider", Takahiro Imamura et al., 1996 IEEE.

"Independent Tuning of The Linear and NonLinear Stiffness Coefficients of A Micromechanical Device", Scott Adams et al. 1996 IEEE.

"Vibrating Structure Gyroscope", British Aerospace, 1994.

"Silicon Resonant Angular Rate Sensor Using Electromagnetic Excitation and Capacitive Detection", M. Hashimoto, 1995.

"Laminated High–Aspect–Ratio Microstructures in a conventional CMOS Process", G.K. Fedder et al., 1996 IEEE.

"Vibrating Beam Accelerometers", Chapter 5, 1984.

"Electrostaically Balanced Comb Drive For Controlled Levitatioln", William Tang, 1990 IEEE.

Helsel M. et al: "A Navigation Grade Micro–Machined Silicon Accelerometer" Position Location and Navigation Symposium (Plans), Las Vegas, Apr. 11–15, 1994. (8 pages).

* cited by examiner

ELECTROSTATIC DRIVE FOR ACCELEROMETER

BACKGROUND OF THE INVENTION

The present invention relates generally to the detection and measurement of forces and more particularly to an electrostatically driven vibratory force transducer for an accelerometer.

A widely used technique for force detection and measurement employs a mechanical resonator having a frequency of vibration proportional to the force applied. In one such mechanical resonator, one or more elongate beams are coupled between an instrument frame and a proof mass suspended by a flexure. An electrostatic, electromagnetic or piezoelectric force is applied to the beams to cause them to vibrate transversely at a resonant frequency. The mechanical resonator is designed so that force applied to the proof mass along a fixed axis will cause tension or compression of the beams, which varies the frequency of the vibrating beams. The force applied to the proof mass is quantified by measuring the change in vibration frequency of the beams.

Recently, vibratory force transducers have been fabricated from a body of semiconductor material, such as silicon, by micromachining techniques. For example, one micromachining technique involves masking a body of silicon in a desired pattern, and then deep etching the silicon to remove portions thereof. The resulting three-dimensional silicon structure functions as a miniature mechanical resonator device, such as a rate gyroscope or an accelerometer that includes a proof mass suspended by a flexure. Existing techniques for manufacturing these miniature devices are described in U.S. Pat. No. 5,006,487, "Method of Making an Electrostatic Silicon Accelerometer" and U.S. Pat. No. 4,945,765 "Silicon Micromachined Accelerometer", the complete disclosures of which are incorporated herein by reference.

In electrostatically driven transducers, the elongate beam (s) are typically vibrated by a drive electrode(s) positioned adjacent to or near each beam. A drive voltage, e.g., alternating current, is applied to the drive electrode(s) in conjunction with a bias voltage to generate an electrostatic force that vibrates the beam(s) at a resonant frequency. Motion of the beam(s), in turn, generates a bias current between the electrode and the beam(s) to produce an electrical signal representing the vibration frequency of the beam. Typically, high bias voltages are considered desirable because the current signal from the charging capacitance is proportional to the bias voltage. Therefore, increasing the bias voltage increases the signal to noise ratio of the resonator, and it requires less amplifier gain for the oscillator circuit.

One of the drawbacks with existing electrostatic drives is that the resonance frequency of the vibrating beam is sensitive to the bias voltage. This is because the electrostatic force applied to the beam is inversely proportional to the distance between the drive electrode and the vibrating beam. As the beam moves toward the electrode, the electrostatic force increases, the change in force working opposite to the elastic force of the beam. Likewise, when the beam moves away from the electrode, the electrostatic force which pulls the beam toward its rest position decreases, so that the change in electrostatic force again works against the elastic restoring force of the beam. Thus, the bias voltage acts as an electrical spring that works against the mechanical spring of the system to lower the resonance frequency. Accordingly, electrostatically driven resonators typically require precise regulation of the bias voltage to ensure accurate detection and measurement of the applied force.

Another important consideration in the manufacture of miniature vibratory force sensing resonators is to minimize variations in the frequency signal from the vibrating beams (except for frequency variations responsive to the applied force). To that end, manufacturers of these devices typically strive to maximize the resonance amplification factor (Q) of the vibrating beams, which generally represents the sharpness of the resonances. The resonance amplification factor or Q is typically maximized by partially or completely evacuating the chamber surrounding the transducer to reduce viscous damping of the resonator beams. Thus, vibratory transducers ideally operate in a vacuum to increase the Q and thereby increase the signal-to-noise ratio of the transducer.

On the other hand, it is desirable, and sometimes necessary, to provide viscous gas damping of the proof mass. Gas damping typically involves locating external fluid, such as air, in contact with the proof mass, thereby controlling the effects of a resonance which would deteriorate the performance of the device. For example, this resonance can cause the proof mass to oscillate back and forth about its rest position after a force has been applied to the proof mass. Undesirable resonance can also be caused by vibrations in the surrounding environment that cause the proof mass to oscillate. Unfortunately, gas damping of the proof mass generally requires the gas pressure within the chamber surrounding the transducer to be substantially above vacuum pressure (typically, on the order of about one atmosphere). This gas pressure becomes trapped between the vibrating beams and the electrodes of the transducer, thereby damping the beam's lateral vibration and reducing their Q. Thus, designers of miniature vibratory transducers are often faced with a compromise between providing gas damping of the proof mass and having a sufficiently high Q to effectively operate the transducer.

What is needed, therefore, are improved methods and apparatus for detecting and measuring forces, such as the force resulting from the acceleration of a proof mass. These methods and apparatus should be capable of operating effectively (i.e., with a sufficient signal-to-noise ratio) at pressure levels above vacuum to permit gas damping of the proof mass. In addition, these methods and apparatus should be designed to minimize the sensitivity of vibration frequency to the drive voltage to increase the accuracy of the force detection device.

SUMMARY OF THE INVENTION

The present invention provides methods and apparatus for detecting and measuring forces with mechanical resonators. These methods and apparatus are useful in a variety of applications, such as angular rate sensors, gyroscopes, accelerometers and the like. The methods and apparatus of the present invention are particularly useful for measuring acceleration, such as the acceleration of a miniature proof mass in a micromachined accelerometer.

The apparatus of the present invention includes a vibratory force transducer for an accelerometer having at least one elongate beam with first and second fixed end portions and a resonating portion therebetween. An electrode is positioned adjacent the beam for generating an electrostatic force to transversely vibrate the resonating portion of the beam at a resonant frequency. The resonant frequency of the beam is generally related to the axial (i.e., compressive or tensile) force applied-to between the fixed ends of the beam so that the magnitude of the axial force applied can be measured by changes in the resonant frequency. According to the invention, the electrode and the beam each have a plurality of fingers extending laterally outward so that the beam fingers and the electrode fingers are intermeshed with each other. Applicant has discovered that the intermeshed fingers of the present invention reduce the transducer's sensitivity to changes in applied voltage, thereby increasing the accuracy of the frequency signal. In addition, the intermeshed fingers of the present invention enable the transducer to operate effectively (i.e., at a Q sufficient to obtain a high signal-to-noise ratio from the vibrating beams) at pressure levels substantially above vacuum, which permits critical gas damping of the proof mass.

In a specific configuration, the transducer of the present invention comprises a pair of substantially parallel beams disposed adjacent to each other and having common ends to form a double ended tuning fork arrangement. The transducer further comprises an elongate electrode located on either side of the beams, and means for generating a drive voltage between each electrode and the adjacent beam. The drive voltage, together with bias voltage from a suitable DC source, produces an electrostatic force that laterally vibrates the beams. Motion of the beams changes the capacitance between the electrode and beam, resulting in a signal which is amplified and used as the drive voltage to drive the beams so that the beams can be used as a resonator in an oscillator circuit. Each beam and electrode have a plurality of intermeshed fingers that are sized and configured so that the distance between the beam fingers and the electrode fingers remains substantially constant as the beams vibrate laterally relative to the electrodes. The electrostatic force between the beams and the electrodes is proportional to the change in capacitance with distance. Since the capacitance between the intermeshed electrode and beam fingers changes linearly with the motion of the beams, the electrostatic force will remain substantially constant as the beams move toward and away from the electrodes. Thus, the resonant frequency of the beams remains substantially constant during beam vibration, which increases the accuracy of the transducer and permits larger drive voltages to be applied to the electrodes, resulting in a larger signal-to-noise ratio and requiring less amplifier gain in the oscillator circuit.

In an exemplary configuration, the accelerometer includes a proof mass suspended from a stationary frame by one or more flexures, and a vibratory force transducer mounted to the proof mass. Preferably, fluid, such as air, is located against the proof mass to damp the proof mass, thereby minimizing proof mass oscillations that may deteriorate the performance of the transducer. To accomplish this, the accelerometer is located within a chamber having an air pressure substantially above vacuum pressure (on the order of about $1/10$ to 1 atmosphere). Typically, this high pressure environment would reduce the Q of the resonator and decrease the accuracy of the accelerometer. The intermeshed fingers of the beams and electrodes of the present invention, however, minimize gas damping of the beams and, therefore, maintain the Q of the resonator at a sufficient level to provide a good quality acceleration signal at atmospheric pressure. Applicant believes that this occurs because, in the configuration of the present invention, the intermeshed fingers generally do not move toward and away from each other as the beams vibrate, and therefore, the air between these fingers contributes substantially less to damping of the vibrating beams.

Other features and advantages of the invention will appear from the following description in which the preferred embodiment has been set forth in detail in conjunction with the accompanying drawings.

DESCRIPTION OF THE SPECIFIC EMBODIMENTS

Referring to the figures, wherein like numerals indicate like elements, a representative force detecting system or accelerometer 2 is illustrated according to the present invention. Accelerometer 2 is a miniature structure fabricated from a body of semiconductor material by micromachining techniques. Suitable techniques for manufacturing accelerometer 2 are described in U.S. Pat. Nos. 5,006,487 and 4,945,765, which have already been incorporated herein by reference. It should be understood, however, that the present invention can be employed with other types of accelerometers, such as quartz transducers or the like.

Figure 1:
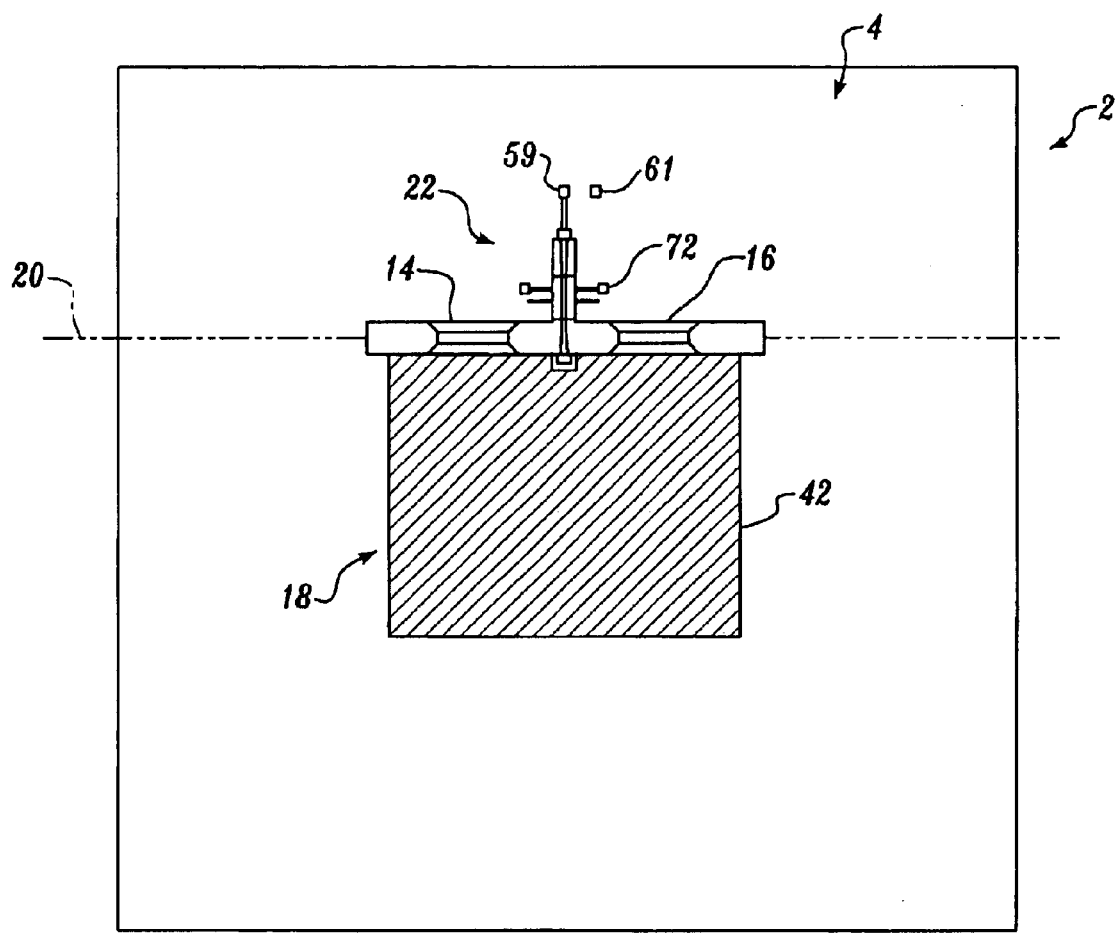
FIG. 1 is a schematic top view of a micro silicon accelerometer incorporating a vibratory force transducer according to the principles of the present invention.

As shown in FIG. 1, accelerometer 2 is preferably formed from a monocrystalline or polycrystalline silicon body 4 that includes a pair of inner flexures 14, 16 supporting a proof mass 18 for movement of the proof mass 18 about a hinge axis 20 parallel to the plane of body 4. Proof mass 18 will move about hinge axis 20 in response to an applied force, such as the acceleration of the vehicle, aircraft or the like that houses accelerometer 2. Accelerometer 2 includes a vibratory force transducer 22 coupled to proof mass 18 and to body 4 for measuring forces applied to proof mass 18 (discussed in detail below). An oscillator circuit 30 (FIG. 6) electrostatically drives transducer 22 at its resonance frequency. When a force is applied to proof mass 18, mass 18 will rotate about hinge axis 20, causing axial forces (compressive or tensile) to be applied to transducer 22. The axial forces change the frequency of vibration of transducer 22 and the magnitude of this change serves as a measure of the applied force.

Figure 2:
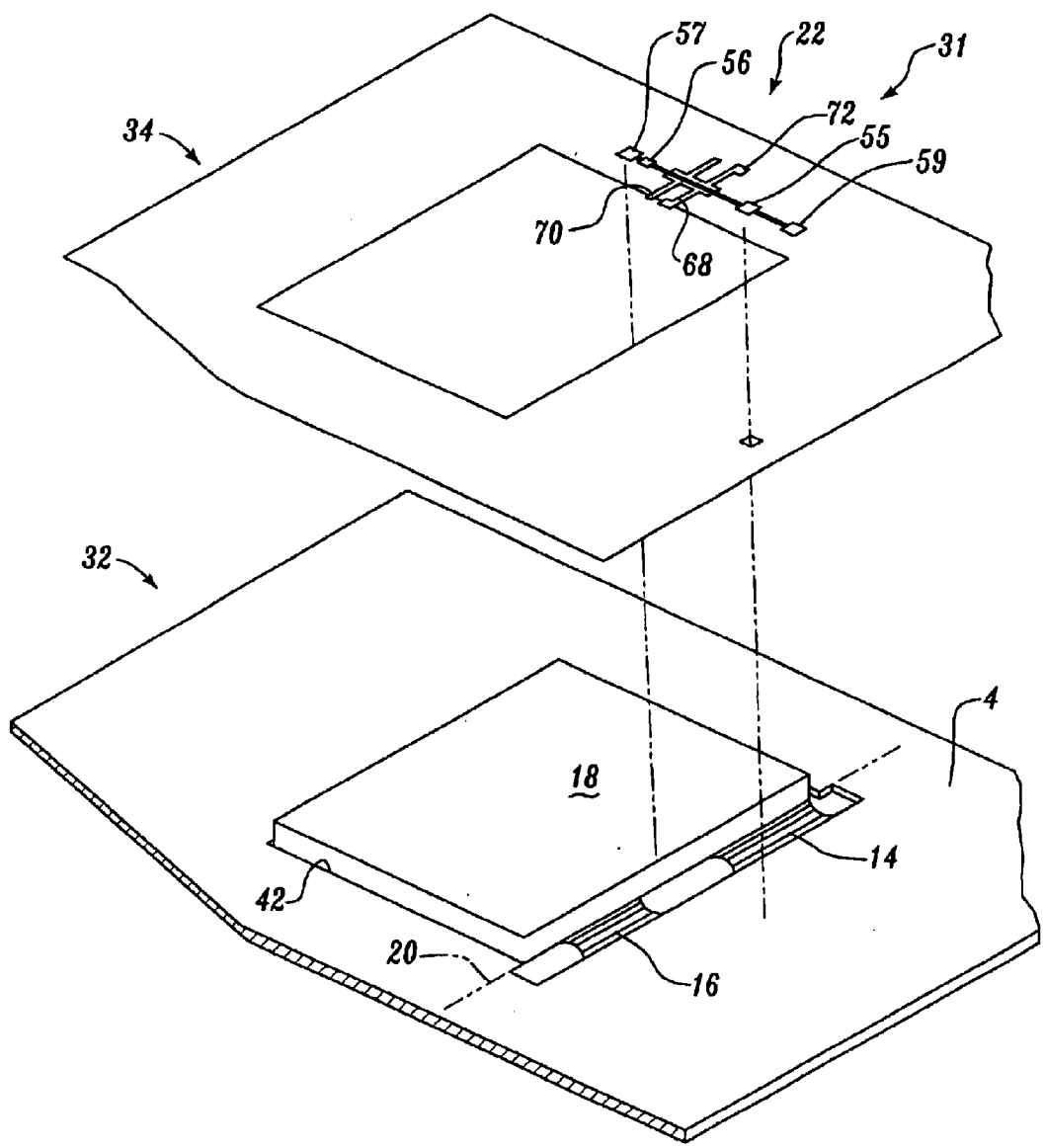
FIG. 2 is an exploded view of the accelerometer of FIG. 1.

As shown in FIG. 2, silicon body 4 comprises an upper silicon or active layer 31 electrically isolated from an underlying substrate 32 by a suitable oxide layer 34 applied to substrate 32. Alternatively, the silicon body 4 may be formed by oxidizing active layer 31 and substrate 32, and then adhering the two layers. Proof mass 18 is formed from substrate 32 by etching a slot 42 through substrate and suitably etching around inner flexures 14, 16. Transducer 22 and the appropriate electrical bonds (discussed below) for coupling transducer 22 to oscillator circuit 30 are formed on active layer 31 by suitable etching techniques, such as reactive ion etching, anisotropic etching or the like. In the preferred embodiment, the remaining portions (not shown) of active layer 31 are then removed to minimize disturbances to the active components.

Figure 3:
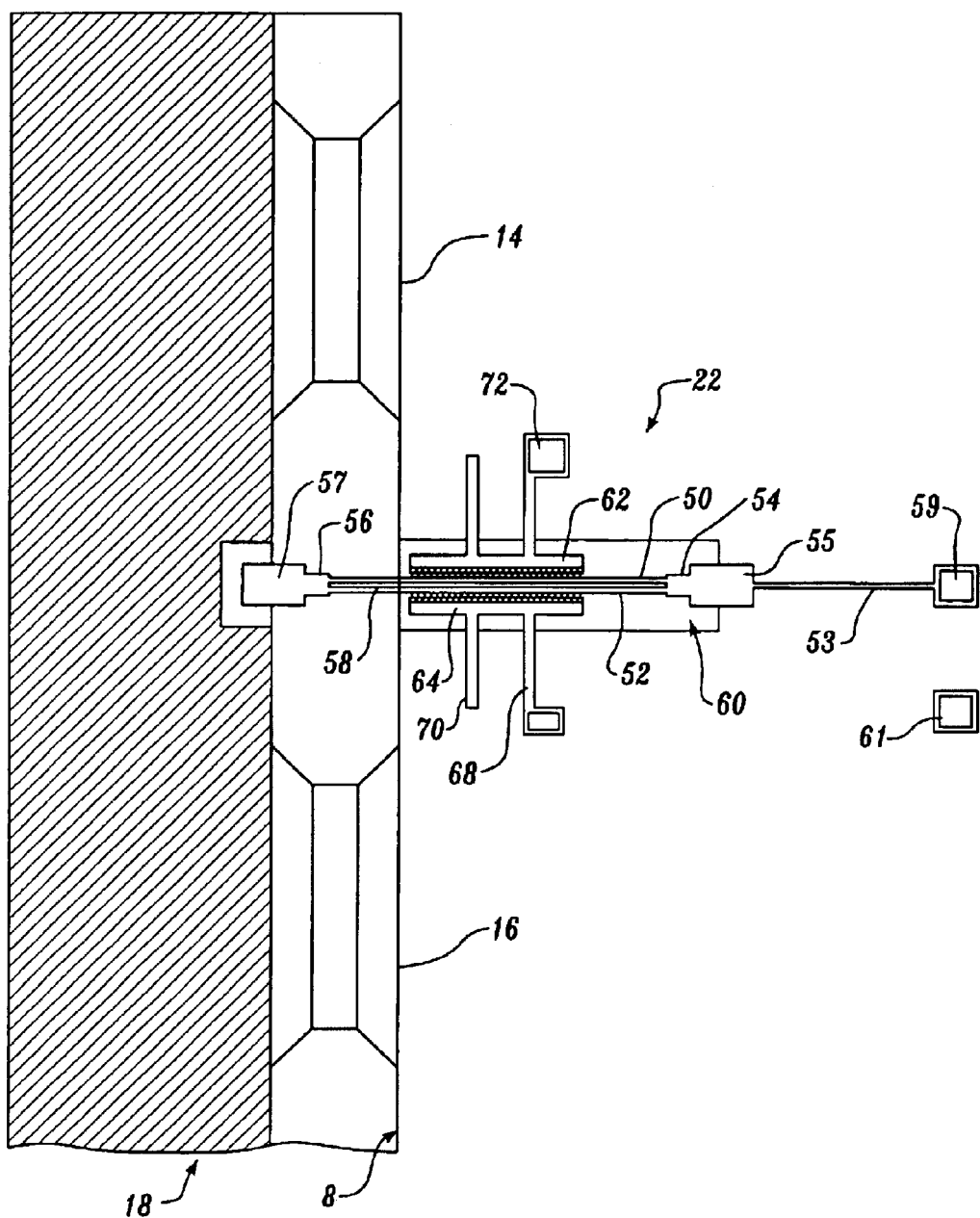
FIG. 3 is an enlarged view of a portion of the accelerometer of FIG. 1, illustrating the vibratory force transducer.
Figure 4:
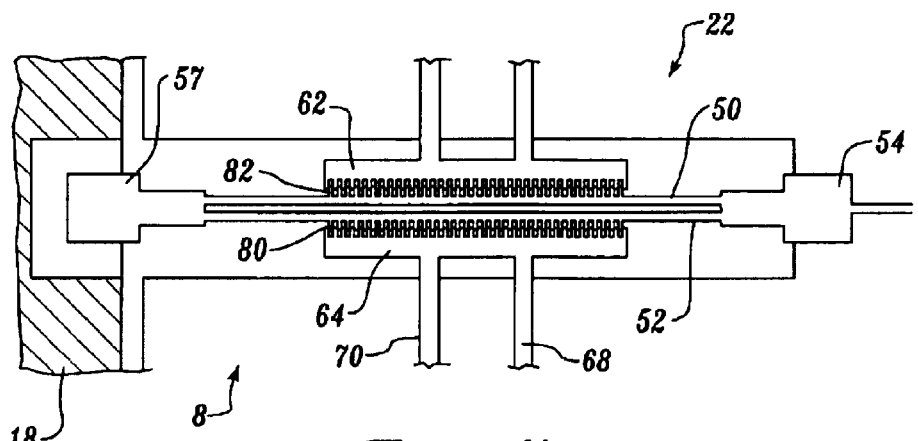
FIG. 4 is an enlarged view of the vibratory force transducer of FIG. 3.
Figure 5:
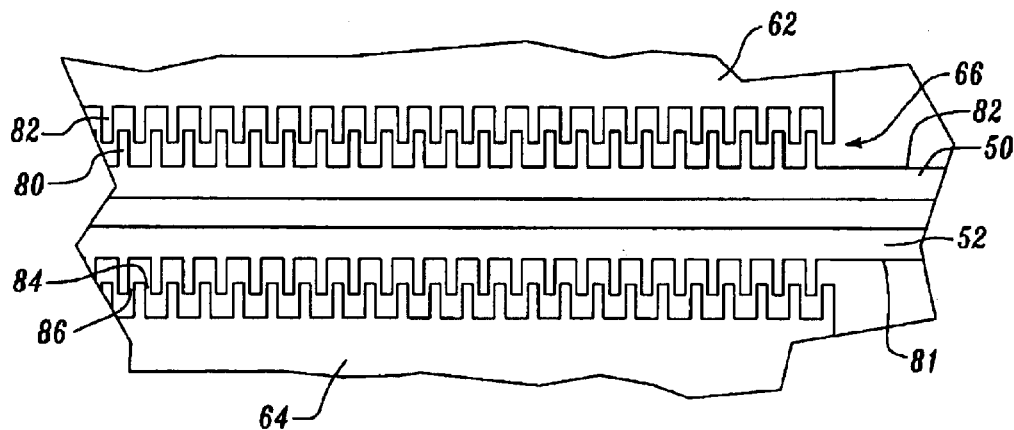
FIG. 5 is a further enlarged view of the vibratory force transducer, illustrating the intermeshed projecting fingers of the present invention.

Referring to FIGS. 3–5, vibratory transducer 22 will now be described in detail. Vibratory transducer 22 comprises a pair of generally parallel beams 50, 52 coupled together at enlarged or widened end portions 54, 56 and separated from each other by a slot 58 to form a double ended tuning fork. Beams 50, 52 are preferably formed from active silicon layer 31 and separated from substrate 32 so that the beams may be vibrated laterally relative to fixed end portions 54, 56 (discussed below). End portions 54, 56 are suitably bonded to proof mass 18 and body 4, respectively, by mounting pads 55, 57. Widened end portions 54, 56 are provided to mechanically couple the vibrating beams 50, 52 to each other. Slot 58 will usually have a width of about 10 to 30 microns and a length of about 1000 to 2000 microns. However, it will be understood that these dimensions may vary depending on the design.

Of course, it should be recognized that the present invention is not limited to the double ended tuning fork described above and shown in FIGS. 3–5. For example, accelerometer 2 may incorporate a single beam or a variety of other mechanical resonator arrangements. However, a double ended tuning fork arrangement is generally preferred because beams 50, 52 can be driven laterally in opposite directions relative to each other. Driving beams 50, 52 in opposite directions minimizes the transfer of energy from the moving beams to the rest of the components id accelerometer 2, which increases the effectiveness of the transducer.

Transducer 22 further includes an electrostatic drive for laterally vibrating beams 50, 52 at the resonance frequency. The electrostatic drive includes a pair of elongate electrodes 62, 64 located on either side of beams 50, 52, respectively. Electrodes 62, 64 are generally parallel to and laterally spaced from beams 50, 52 by a gap 66 (see FIG. 5). Electrodes 62, 64 are etched from active layer 31 and doped with a suitable conductive material to create the necessary charge carriers and to facilitate completion of the electrical circuit. Alternatively, electrodes 62, 64 may be formed from an electrically conductive material, such as gold, that is bonded to active layer 31.

As shown in FIGS. 1 and 3, each electrode 62, 64 is supported by a pair of support arms 68, 70 extending laterally away from beams. Support arms 68, 70 serve to minimize vibrations in electrodes 62, 64. One of the support arms 68 on each electrode 62, 64 is coupled to a bonding pad 72 for electrically coupling electrodes,62, 64 to oscillation circuit 30 (see FIG. 5). Mounting pad 55 is coupled to an arm 53 that electrically couples beams 50, 52 to abonding pad 59. Bonding pad 59 is suitably coupled to oscillation circuit 30 to complete the electrical circuit with electrodes 62, 64 and beams 50, 52. As shown in FIG. 2, substrate 32 may also include a bonding pad (not shown) for electrically connecting substrate 32 to ground. Bonding pads 59, 72 and the bonding pad for connecting substrate 32 to ground are formed from a suitable conductive material, such as gold.

Referring now to FIGS. 4 and 5, beams 50, 52 each include a plurality of fingers 80 projecting outward from a lateral surface 81 of each beam 50, 52 toward the corresponding electrode 62, 64. Likewise, electrodes 62, 64 each include a plurality of fingers 82 projecting laterally inward so that beam fingers 80 and electrode fingers 82 are intermeshed with each other. Fingers 80, 82 are each sized so that their ends 84 will not contact beams 50, 52 or electrodes 62, 64 when beams 50, 52 are laterally vibrated relative to electrodes 62, 64. Usually, fingers 80, 82 will have a length of about 20 to 60 microns and preferably about 35 to 45 microns so that fingers 80, 82 overlap each other in the lateral direction by about 2–10 microns. Electrode fingers 82 and beam fingers 80 are axially spaced from each other by a suitable distance to provide electric capacitance therebetween. Usually, electrode and beam fingers 82, 80 will be spaced by about 2 to 10 microns from each other and preferably about 4 to 8 microns. Since beam fingers 80 are axially spaced from electrode fingers 82, the distance between these fingers will generally remain constant as beams 50, 52 vibrate in the lateral direction.

Electrostatic force is generally proportional to the square of the charge, which is proportional to the voltage and to the capacitance between the beam and the electrode. The capacitance is inversely proportional to the distance between the beam and the electrode. Accordingly, the electrostatic force is proportional to the square of the voltage and inversely proportional to the square of the distance between the beam and the electrode. Thus, changes in the distance between the beam and the electrode will typically change the electrostatic force. In fact, this change in the electrostatic force often acts as an electrical spring that works opposite to the elastic force or mechanical spring of the beams to lower the resonance frequency. For example, as the beam moves from its rest position closer to the electrode, the electrostatic force increases, the change in force working opposite to the elastic force of the beam. When the beam moves from its rest position away from the electrode, the electrostatic force decreases, so that the change in electrostatic force again works against the elastic restoring force of the beam. This lowers the resonance frequency of the beam by a factor related to the magnitude of the bias voltage. Accordingly, the resonant frequency of the beams is generally sensitive to changes in the bias voltage.

In the present invention, the distance between intermeshed beam and electrode fingers 80, 82 remains substantially constant as the beams 50, 52 vibrate relative to the stationary electrodes 62, 64. The electrostatic force between the beams and the electrodes is generally proportional to the change in capacitance with distance. Since the capacitance between the intermeshed electrode and beam fingers changes linearly with the motion of the beams, the electrostatic force will remain substantially constant as the beams move toward and away from the electrodes. Accordingly, the electrostatic force will remain substantially constant during vibration of beams 50, 52 and, therefore, will not work against the mechanical spring of the beams 50, 52 to lower the resonance frequency. Thus, the sensitivity to changes in bias voltage is decreased with the present invention. Applicant has found that this sensitivity is reduced by 5 to 10 times compared to a similar resonator that does not incorporate intermeshed fingers. Reducing the sensitivity of the resonance frequency to changes in bias voltage increases the accuracy of the vibratory force transducer. In addition, this allows the transducer to effectively operate with higher bias voltage levels, which results in a larger signal-to-noise ratio and requires less amplifier gain in the oscillator circuit. Usually, a bias voltage of about 5 to 100 Volts will be applied to electrodes 62, 64 and beams 50, 52 and preferably at least 50 Volts will be applied to the electrodes and beams.

Figure 6:
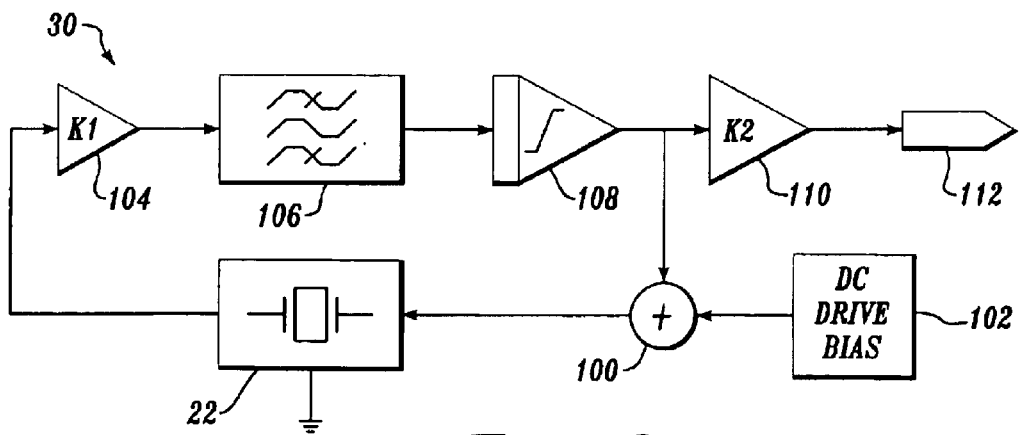
FIG. 6 is a block diagram of an electrical circuit for driving the transducer of FIG. 3.

FIG. 6 illustrates a representative oscillation circuit 30 in which vibrating beams 50, 52 of transducer 22 function as a resonator. A transimpedance amplifier 104 converts a sense current received from vibrating beams 50, 52 to a voltage. This voltage is filtered by a bandpass filter 106, which reduces noise, and its amplitude is controlled by an amplitude limiter 108. The resulting signal is combined with the output or DC bias voltage from a DC source 102 in a summing junction 100. The DC bias voltage generates a force between electrodes 62, 64 and beam 50, 52. The signal from amplitude limiter 108 modulates this force causing beams 50, 52 to vibrate laterally at their resonant frequency. This lateral beam motion, in turn, generates the sense current. An output buffer 110 isolates the oscillator from external circuitry connected to an ouput 112 of oscillation circuit 30. The gain in oscillation circuit 30 sustains oscillation of beams 50, 52.

As shown in FIG. 1, forces applied to proof mass 18 will cause proof mass 18 to rotate about hinge axis 20. This rotation generates an axial force against transducer 22. The axial force applied to transducer 22 proportionally changes the vibration frequency of beams 50, 52. To minimize changes in the vibration frequency of beams 50, 52 that are not related to the applied force, it is advantageous to have a relatively high velocity from the vibrational motion of beams 50, 52. The vibrational velocity is generally proportional to the resonance amplification factor (Q) and, therefore, it is generally considered beneficial to maximize the Q of vibratory transducers 22, 24. Typically, Q is maximized by partially evacuating accelerometer 2 to reduce damping of beams 50, 52. This is because the air between the moving beams 50, 52 and the electrodes 62, 64 damps the movement of beams 50, 52 toward electrodes 62, 64. On the other hand, it is also desirable to provide gas damping of proof mass 18 to minimize the vibration of proof mass 18 that is not related to an applied force. For example, if a force were applied to mass 18 in a vacuum or near vacuum, the mass 18 would continue to swing back and forth about inner flexures 14, 16 until it eventually slowed to a halt. Undesirable resonance can also be caused by vibrations in the surrounding environment (other than the applied force) that cause the proof mass to oscillate. Gas damping of proof mass 18 minimizes these undesirable oscillations.

Applicant has found that intermeshed beam and electrode fingers 80, 82 decease the damping of beams 50, 52 at pressures above vacuum on the order of 5 to 10 times. In fact, transducer 22 of the present invention operate effectively in air having substantially higher pressure levels than vacuum (on the order 1/10 to 1 atmosphere). Applicant believes that this occurs because a portion of the air between beams 50, 52 and electrodes 62, 64 is located in the axial gaps between beam and electrode fingers 80, 82. Since fingers 80, 82 are not moving toward and away from each other, this portion of the air contributes substantially less to the damping of the beams 50, 52. Accordingly, transducers 22, 24 can be operated at atmospheric pressure, which allows proof mass 18 to be gas damped to minimize undesirable vibrations in the proof mass 18.

Although the foregoing invention has been described in detail for purposes of clarity, it will be obvious that certain modifications may be practiced within the scope of the appended claims. For example, although the present invention is particularly useful for electrostatically driven resonators, it may also be used with other drive means, such as piezoelectric drives, electromagnetic drives, thermal drives or the like.

What is claimed is:

1. A vibrating beam force transducer for an accelerometer comprising:

at least a first vibrating beam having a longitudinal axis, first and second fixed end portions and a resonating portion therebetween, said resonating portion defining a lateral wall and having one or more fingers formed substantially coplanar with said beam and projecting from said lateral wall; and an electrode positioned adjacent to and spaced from said beam for generating an electrostatic force to vibrate said resonating portion of said beam in a transverse direction, said electrode having one or more fingers extending toward said resonating portion of said beam;

wherein a second vibrating beam spaced from said first beam opposite said electrode, said second beam having a longitudinal axis substantially parallel to said first beam, first and second fixed end portions and a resonating portion therebetween; and wherein the fixed end portions of the first and second beams are contiguous with each other to form a double ended tuning fork.

* * * * *